No. 865,497. PATENTED SEPT. 10, 1907.
D. M. KENYON.
PIPE COUPLING AND METHOD OF APPLYING SAME.
APPLICATION FILED OCT. 11, 1905.
2 SHEETS—SHEET 1.
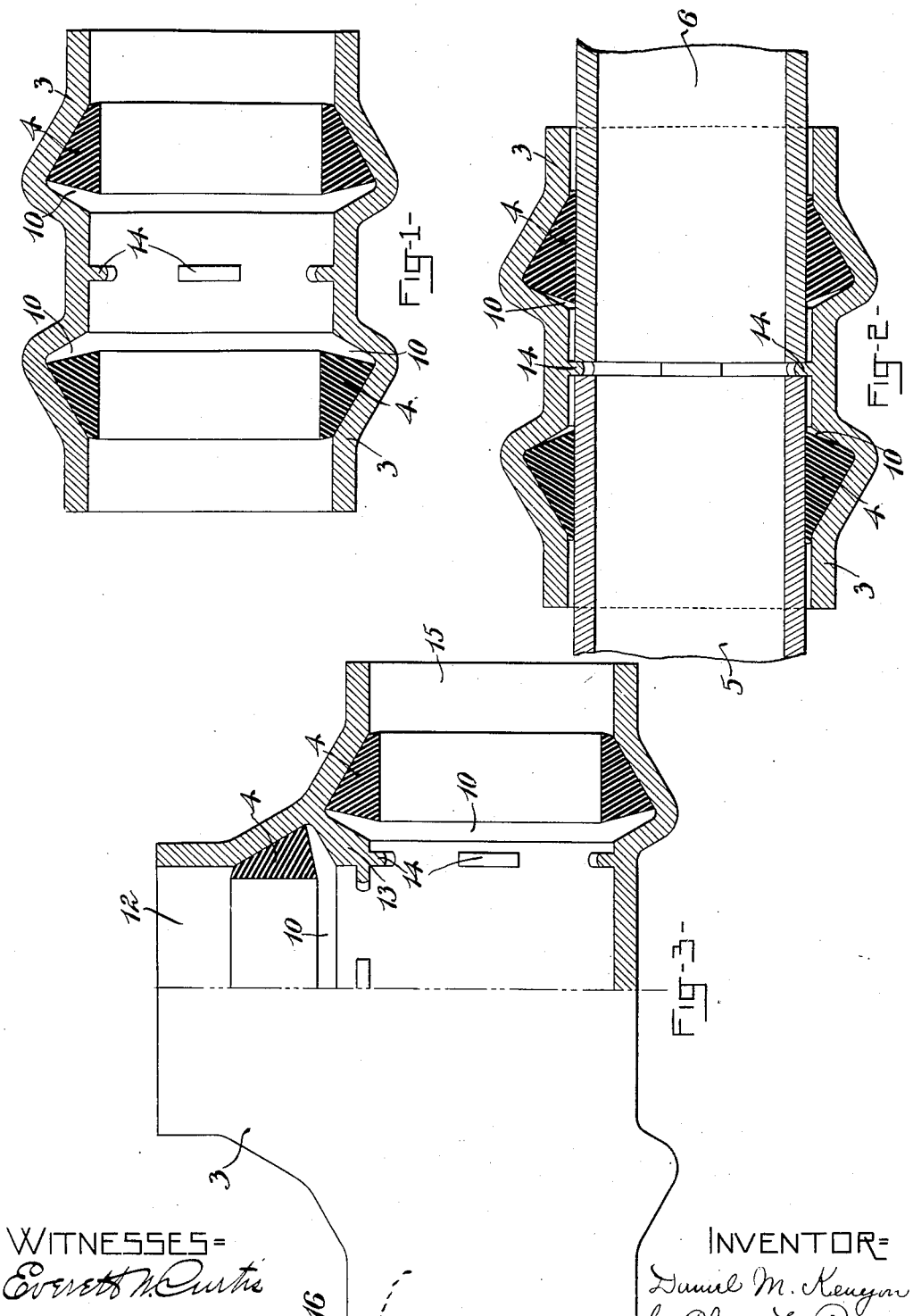
WITNESSES:
INVENTOR:
Daniel M. Kenyon
by Chas. F. Perkins
his Attorney No. 865,497. PATENTED SEPT. 10, 1907.
D. M. KENYON.
PIPE COUPLING AND METHOD OF APPLYING SAME.
APPLICATION FILED OCT. 11, 1905.
2 SHEETS—SHEET 2.
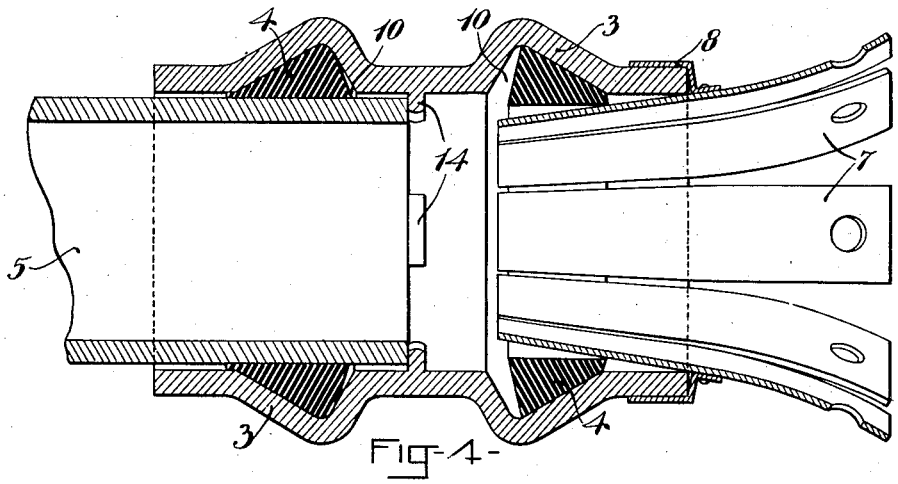
Fig-4-
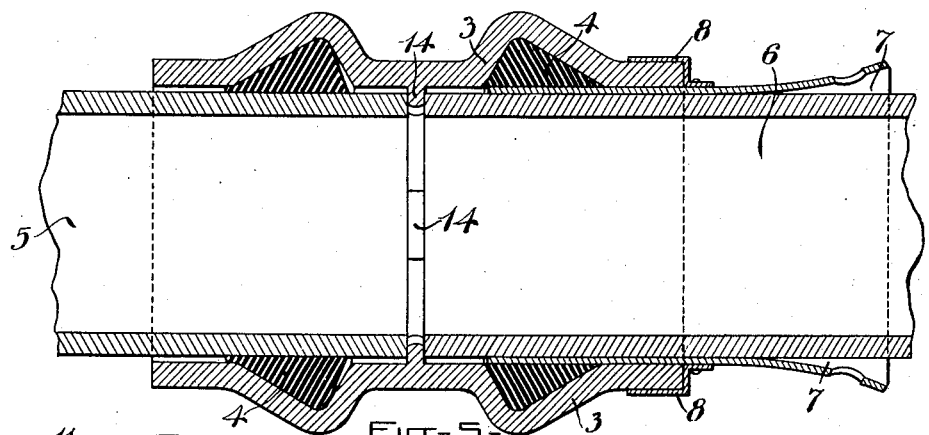
Fig-5-
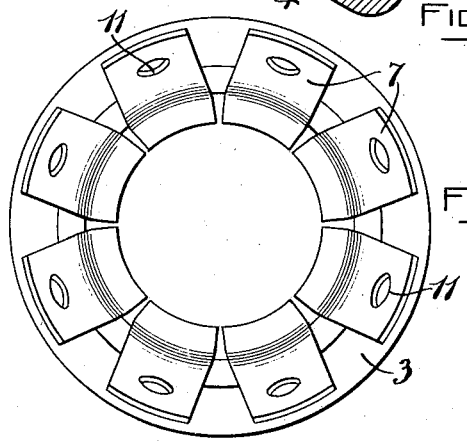
Fig-6-
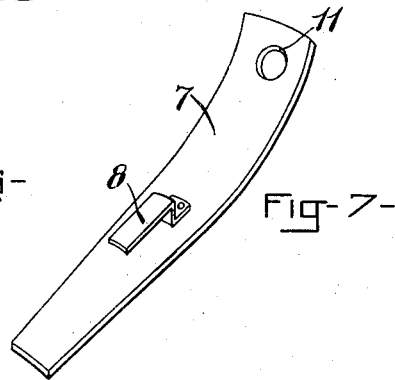
Fig-7-
WITNESSES=
Everett N. Curtis
Ernest L. Briggs
INVENTOR=
Daniel M. Kenyon
by Chas. F. Perkins
his Attorney

UNITED STATES PATENT OFFICE.

DANIEL MERRITT KENYON, OF BRADFORD, PENNSYLVANIA, ASSIGNOR OF ONE-HALF TO JAMES B. ETHERINGTON, OF BRADFORD, PENNSYLVANIA.

PIPE-COUPLING AND METHOD OF APPLYING SAME.

No. 865,497.  Specification of Letters Patent.  Patented Sept. 10, 1907.

Application filed October 11, 1905. Serial No. 282,247.

*To all whom it may concern:*

Be it known that I, DANIEL MERRITT KENYON, a citizen of the United States, residing at Bradford, in the county of McKean and State of Pennsylvania, have invented new and useful Improvements in Pipe-Couplings and Methods of Applying Same, of which the following is a specification.

My invention relates to couplings for gas, water or steam pipes and the method of applying the same and the object of my invention is to provide an effective means of forming tight joints therein.

My invention consists primarily in providing a coupling made of a single piece of metal or other suitable material in the interior of which annular recesses are formed for the reception of a yielding packing, which recesses and packing are so constructed as to obviate the use of screw threads ribs or bolts either in the sections of pipe or in the said coupling.

The essence of my invention consists in interposing annular rings of yielding packing whose interior diameter is greater than the exterior diameter of the pipe between the outer wall of the pipe and the interior wall of the coupling and in such manner that the packing recess of the coupling is substantially filled by said packing and that the pressure of the fluid contained in the pipe will have a tendency to compress the packing into a space of diminishing area and to close the space between the outer surface of the pipe and the interior surface of the coupling more tightly as the pressure of the fluid increases. Preferably the outer inclined surface of said annular packing ring comes in contact with the wall of the recess before as well as after compression, so that there is no tendency at any time for the packing to draw away from the wall of the coupling. The exterior diameter of said ring is thus in such case substantially the same as the interior diameter of the larger member so that the ring fits snugly therein; and its interior diameter being less than the exterior diameter of the smaller member, it is impossible to assemble the members solely by the insertion of one member within the other, without the use of inserting tools.

My invention further consists in the various details of construction and improvements hereinafter specifically described and claimed.

Reference is hereby made to the accompanying drawing in which similar numerals of designation refer to similar parts throughout the several views.

Figure 1 is a longitudinal section of my improved coupling, and packing, showing the position of the parts before the ends of the pipe are inserted. Fig. 2 is a longitudinal section of my improved coupling, packing and sections of pipe therein introduced. Fig. 3 is a view of a T coupling embodying my invention, showing the same partly in elevation and partly in section. Fig. 4 is a longitudinal section of my improved coupling, packing and pipe, showing the implement used for applying the coupling. Fig. 5 is a longitudinal section of the coupling, packing and pipe, showing the position of the inserting implement or strips after the coupling has been applied and before the said strips have been withdrawn. Fig. 6 is an end elevation of the coupling and inserting implement or strips shown in Fig. 4. Fig. 7 is a perspective view of one of the inserting strips.

Referring to the drawing, 3 is a coupling of metal, clay or other suitable material and having on the interior thereof two annular recesses 10, adapted to receive and retain annular rings of packing of compressible material, preferably cork or rubber, to allow the introduction of the sections of pipe. The said rings may be composed of any number of strips or sections, but preferably are formed from one strip of material; they are so formed that before being compressed their interior diameter is smaller than the exterior diameter of the pipe to be inserted into the coupling.

In some cases it will be found desirable to use packing which is impervious to crude oil, and for this purpose I have found that wood or fibrous material is effective.

The packing 4 fits closely around the sections of pipe 5 and 6 and also presses outwardly into the annular recesses 10 so as to substantially fill the same and in such a manner as to prevent the escape of the fluid or gaseous vapor carried in the pipe, and at the same time to securely hold and retain the said sections of pipe in alinement. The said sections of pipe 5 and 6 are preferably of iron or steel but may be of any material suitable for the purpose of my invention.

In Fig. 3, I have shown my invention adapted for use in what is commonly known as a T coupling, by means of which three sections of pipe may be coupled together. 12, 15 and 16 are branches of the coupling into which three respective sections of pipe may be inserted. 13 are two abutments serving as partitions between two adjacent recesses, and carrying thereon two of the lips 14. But one of the abutments is shown in the drawing, the other being hidden by the wall of the coupling, and being similar in size and form to the abutment shown. The recesses 10, packing 4, and lips 14 are the same as those shown in other views of my invention.

In practicing my invention, I employ the inserting tool or implement shown in Figs. 4, 5, 6 and 7 and described in my application for Letters Patent, filed April 27th, 1906, Serial Number 313,908 which is a division of this invention. The strips may be curvilinear, flat, round, and of other forms so long as they serve the purpose of inserting the pipe in the coupling.

The operation of my tool or implement is obvious. The strips 7 are first inserted in the coupling in the manner shown in Figs. 4 and 6, there being a sufficient number of said strips so that the entire circumference of the interior of the coupling is covered or nearly so. The strips being in position a section of pipe is then forced into the coupling, the inner ends of the strips forcing outwards the yielding packing 4 and permitting said section of pipe to be readily forced into its proper position, the inserting strips are then removed and the operation is then repeated on the opposite side of the coupling.

It will be understood of course that the compression of the ring into its recess may be effected otherwise than by the introduction of the pipe. For instance the outer ends of the strip 7 may be grasped or otherwise operated upon so as to oscillate the strips in such manner as to cause the inner ends of the strips to move outward and compress the ring. In any event, the compression of the ring takes place before the end of the pipe that is being introduced reaches the packing ring or those portions of the strips 7 which are in the plane of the ring. Of course the further introduction of the pipe will still more compress the ring by expanding its interior diameter through the medium of the strips 7. In this manner I am able to employ a packing ring which is normally of so much smaller interior diameter than the exterior diameter of the pipe to be inserted, that when the strips 7 are removed the ring expands and forms a tight joint with, or bearing on, a wide area of the inserted pipe.

By the use of my improved coupling I am enabled to dispense with the use of ribs, bolts or screws or screw threads of any kind whatsoever and to effect the production of an article which is at the same time inexpensive and of great utility. When the ordinary screw threaded couplings are used to connect sections of pipe, much time and labor are necessary to effect the laying of a system. These threaded couplings are ordinarily connected when the conduit or pipe is in the ditch and the use of wrenches and jacks is necessary. By the use of my device, however, wrenches and like tools are rendered unnecessary, and the pipe therefore is installed in much less time and with less expenditure of labor. Another advantage is that a much lighter section can be employed. The annular recesses 10 are preferably shaped so that each diminishes in depth gradually towards the edge of the coupling nearest thereto. The purpose of such construction being to utilize the pressure of the fluid which is carried through the pipes so as to force the thicker portion of the packing into the shallow portion of the recess and to fill more tightly the space between the exterior surface of the pipe and the coupling and prevent any leakage of the contents of the pipe.

In practice I find it desirable to keep the edges of the two sections of pipe slightly separated so that the gas or other fluid can readily escape into the interior of the coupling, and for this purpose I provide lips 14 on the inside surface thereof, which lips are of sufficient size to engage the said edges of pipe and keep the section of the same in the relation desired.

While I prefer to use the lips 14, they are not essential elements of my invention and may be entirely dispensed with, it being impossible, of course, to fit the edges of the ends of pipe so closely as to avoid the escape of the fluid.

It is obvious that the greater the pressure exerted on the said annular packing strips 4 the more strongly and firmly are the pipes and coupling held together and the more tightly is the space closed between the pipe and the coupling.

It will be observed that the inner portion or surface of each ring which bears on the pipe is wide. That is, such inner portion is wider than the outer portion of the ring. If the ring were circular in cross-section, its inner portion bearing on the pipe would be relatively narrow. By means of the wide base, contact with the pipe is effected over a wide area of the latter and renders leakage impossible. Since the normal interior diameter of the ring is considerably smaller than the exterior diameter of the pipe, the wide inner portion of the ring would prevent the insertion of a pipe without the above-described preliminary compression of the ring outward into its recess as above set forth.

It is to be understood that the invention resides in the means and method whereby two tubular members are joined or coupled together, regardless of which member fits within the other and regardless of which one is called a pipe or whether both members are called pipes. For convenience of description, the members 5 and 6 have been herein referred to as pipes, and the member 3 as the coupling, but it is to be understood that I do not limit myself by the use of such terms, and that said terms are to be construed as broadly as if both parts were called tubular members or pipes, and regardless of whether both members are of the same length so that both would usually be called pipe sections, or whether one member is a long pipe section and the other member short so as to be defined as a coupling. In other words, the member 3 might be as long as the members 5 and 6 so as to constitute a long coupling instead of a short one, in which case each section or length would constitute a coupling for the two adjacent lengths.

My improved coupling is designed to be used particularly on pipes for natural gas where the pressure constantly varies and a strong and tight coupling is necessary. For this purpose the ordinary screw coupling has been found to be defective for the reason of the difficulty of keeping the same perfectly tight.

While I have described a particular form of my invention I do not limit my invention to the specific device shown, as it is obvious that the shape of my coupling may be varied without departing from my invention, so long as a recess is formed between the surface of the pipe and the coupling which contains an annular ring of compressible packing adapted to close tightly the space between the pipe and coupling the interior diameter of said ring when placed in said recess being smaller than the exterior diameter of the pipe.

What I claim and desire to secure by Letters Patent is:—

1. A pipe joint consisting of two tubular members the end of one member being inserted into the end of the other, the latter having an integral-walled recess containing an annular packing ring of compressible material having its inner portion wider than its outer portion and substantially filling said recess, and being compressed between the exterior wall of the smaller member and interior wall of the larger member, the exterior wall of the smaller member and the interior wall of the larger member being formed so that an increase of the pressure of the fluid tends to compress the packing more tightly into the space occupied by the packing, said ring before compression being sufficiently thicker than the width of the space between the two members to prevent the assembling of the members solely by the insertion of one member within the other.

2. A pipe joint consisting of a coupling formed of a single piece of material and embracing the adjacent ends of two lengths of pipe, and said coupling having a recess containing an annular packing ring of compressible material having its inner portion wider than its outer portion and substantially filling said recess and being compressed between the exterior wall of each length of pipe and the interior wall of the coupling, the exterior wall of the pipe and interior wall of the coupling being formed so that an increase of the pressure of the fluid tends to compress the packing more tightly into the space occupied by said packing, said ring before compression being sufficiently thicker than the width of the space between the coupling and pipe to prevent the insertion of the pipe within the coupling solely by slipping the pipe into the coupling.

3. A pipe coupling formed of a single piece of material and having therein annular recesses, each recess decreasing in diameter towards the nearer end of said coupling, annular rings of compressible material having their inner portions wider than their outer portions and substantially filling said recesses, said packing being maintained under the pressure of the confined gas or fluid, and each of said rings before compression being sufficiently thicker than the width of the space between the coupling and the pipe to be inserted therein to prevent the insertion of the pipe within the coupling solely by slipping the pipe into the coupling.

4. A pipe joint consisting of a coupling formed of a single piece of material and inclosing the adjacent ends of three lengths of pipe, the said coupling having three annular recesses in its interior surface and the extremity of each length of pipe being located between two of said recesses, and said recesses having annular rings of yielding packing located therein and having their inner portions wider than their outer portions and substantially filling said recesses and closing the space between the interior surface of the coupling and the exterior surface of the pipe, and each of said rings before compression being sufficiently thicker than the width of the space between the coupling and pipe members to prevent the assembling of the members solely by the insertion of one member within the other.

5. A method of coupling pipe having a compressible ring of packing located in a recess in the interior surface of the larger pipe, said ring being of less diameter than the exterior diameter of the inner pipe, which consists in compressing said ring, then introducing the smaller pipe within said packing while the said packing is compressed, and then releasing the pressure on said packing to permit contact of the same with the pipe.

6. A method of coupling pipe in which couplings are employed having compressible rings of packing located in recesses in the interior surface of said coupling, said rings being of less diameter than the exterior diameter of the pipe, which consists in compressing the said rings, then introducing the pipe within said packing while the said packing is compressed, and then releasing the pressure on said packing to permit contact of the same with the pipe.

7. A method of coupling pipe containing rings of compressible packing located in recesses in the interior surface of said coupling, said rings being of less diameter than the exterior diameter of the pipe, which consists in compressing said rings by introducing therein a plurality of longitudinally curved strips adapted to fit the interior of said coupling, together with means for retaining said strips in said position, and then compressing said packing by pressing outwardly the said strips, and inserting said pipe between said strips, and after said insertion removing said strips.

8. A method of coupling pipe containing rings of compressible packing located in recesses in the interior of said coupling, said rings being of less diameter than the exterior diameter of the pipe, which consists in first compressing said rings by introducing therein a plurality of longitudinally curved strips adapted to fit the interior of said coupling, then compressing said packing by expanding the circle formed by the inner ends of said strips, then inserting said pipe within the compressed packing, and then removing said strips.

9. A method of coupling pipe having a compressible ring of packing located in the space between the walls of two tubular members, one of which is inserted within the other, said ring being thicker than the space between said walls, which method consists in compressing said ring, then introducing the smaller member within the larger member while the said packing is compressed, and then releasing the pressure on said packing to permit the packing to expand.

10. A pipe joint consisting of two tubular members, the end of one member being inserted into the other and having an annular space between the exterior wall of the inner member and the interior wall of the outer member, said space being occupied by an annular ring of yielding material held under compression, said annular ring before compression being sufficiently thicker than the width of said space to prevent the assembling of the members solely by the insertion of one member within the other.

11. A pipe joint consisting of two tubular members, the end of one member being inserted into the other, and having an annular space between the exterior wall of the inner member and the interior wall of the outer member, one of said members having an annular recess in its wall connecting with said space, said recess being occupied and substantially filled by an annular ring of yielding material held under compression, and said annular ring before compression being sufficiently thicker than the width of said space to prevent the assembling of the members solely by the insertion of one member within the other.

12. A pipe joint consisting of two tubular members, the end of one member being inserted into the other and having an annular space between the exterior wall of the inner member and the interior wall of the outer member, said space being occupied by an annular ring of yielding material held under compression, said annular ring before compression being sufficiently thicker than the width of said space to prevent the assembling of the members solely by the insertion of one member within the other, and the exterior wall of the smaller member and the interior wall of the larger member being so formed that an increase of the pressure of the fluid tends to compress the packing more tightly into the space occupied by said packing.

13. The herein described method of forming a joint between sections of pipe consisting in placing a gasket in a suitable recess in a socket, inserting a tool within the gasket, inserting the end of the pipe within the tool and then withdrawing the tool.

14. A method of coupling pipe having a compressible ring of packing located in a recess in the interior surface of the larger pipe, the ring being of less diameter than the exterior diameter of the inner pipe, which consists in compressing the packing and introducing the smaller pipe within the packing while the packing is compressed, and then releasing the packing to permit contact of the packing with the pipe.

15. A method of coupling pipe in which couplings are employed having compressible rings of packing located in recesses in the interior surface of the coupling, the packing rings being of less diameter than the exterior diameter of the pipe, which consists in compressing the rings and introducing the pipe within the packing while the packing is compressed, and then releasing the packing to permit contact of the same with the pipe.

16. A method of coupling pipe containing a ring of compressible packing located in a recess in the interior of a coupling, the ring being of less diameter than the exterior diameter of the pipe, which consists in introducing a plurality of longitudinally inclined strips adapted to fit the interior of the coupling, then compressing the packing by the insertion of the pipe within the strips, and then removing the strips.

17. A method of coupling pipe having a compressible ring of packing located in the space between the walls of two tubular members, one of which is inserted within the other, the packing ring being thicker than the space between the walls of the members, which method consists in compressing the packing ring and introducing the smaller member within the larger member while the packing is compressed, and then releasing the packing.

18. A pipe joint consisting of two tubular members, the end of one member being inserted in the end of the other, the latter having an integral-walled recess containing an annular packing ring of compressible material having its inner portion wider than its outer portion, and being so compressed between the exterior walls of the smaller member and the interior wall of the larger member and the wall of the larger member being so formed that an increase of the pressure of the fluid tends to compress the packing ring more tightly into the space occupied by the packing ring, the packing before compression being so much thicker than the width of the space between the two members as to prevent the assembling of the members solely by the insertion of one member within the other.

19. A pipe joint consisting of a coupling formed of a single piece of material and embracing the adjacent ends of two lengths of pipe, the coupling having a recess containing an annular packing ring of compressible material having its inner portion wider than its outer portion and being so compressed between the exterior wall of each length of pipe and the interior wall of the coupling and the interior wall of the coupling being so formed that an increase of the pressure of the fluid tends to compress the packing more tightly into the space occupied by the packing, the packing before compression being so much thicker than the width of the space between the coupling and pipe as to prevent the insertion of the pipe within the coupling solely by slipping the pipe into the coupling.

20. A pipe coupling formed of a single piece of material and having therein annular recesses, each recess decreasing in diameter toward the waist of the coupling, annular rings of compressible material having their inner portions wider than their outer portions, these rings being maintained under the pressure of the confined gas or fluid, and each of the rings before compression being so much thicker than the width of the space between the coupling and the pipe to be inserted therein as to prevent the insertion of the pipe within the coupling solely by slipping the pipe into the coupling.

21. A pipe joint consisting of two tubular members, the end of one member being inserted into the end of the other and having an annular space between the exterior wall of the inner member and the interior wall of the outer member, this space being occupied by an annular ring of yielding material held under compression, the annular ring before compression being so much thicker than the width of the space as to prevent the assembling of the members solely by the insertion of one member within the other.

22. A pipe joint consisting of two tubular members, the end of one member being inserted into the end of the other and having an annular space between the exterior wall of the inner member and the interior wall of the outer member, this space being occupied by an annular ring of yielding material held under compression, the annular ring before compression being so much thicker than the width of the annular space as to prevent the assembling of the members solely by the insertion of one member within the other, and the annular ring and the interior wall of the larger member being so formed that an increase of the pressure of the fluid tends to compress the packing more tightly into the space occupied by the packing.

23. A method of coupling pipe having a compressible ring of packing located in a recess in the interior surface of the larger pipe, said ring having an exterior diameter substantially the same as the diameter of said recess, and said ring being of less interior diameter than the exterior diameter of the inner pipe, which consists in compressing said ring, then introducing the smaller pipe within said packing while the said packing is compressed, and then releasing the pressure on said packing to permit contact of the same with the inner pipe.

24. A pipe joint consisting of two tubular members, the end of one member being inserted into the other and having an annular space between the exterior wall of the inner member and the interior wall of the outer member, said space being occupied by an annular ring of yielding material held under compression, said annular ring before compression having an exterior diameter substantially the same as the interior diameter of the outer member at the point where said ring is located, and being sufficiently thicker than the width of said space to prevent the assembling of the members solely by the insertion of one member within the other.

In testimony whereof I have hereunto set my hand in presence of two subscribing witnesses, this fourth day of October 1905.

DANIEL MERRITT KENYON.

Witnesses:
ELMER L. BRIGGS,
EVERETT N. CURTIS.